United States Patent [19]
Urban et al.

[11] Patent Number: 5,591,258
[45] Date of Patent: Jan. 7, 1997

[54] PREPARATION OF LINEAR, UNSUBSTITUTED QUINACRIDONE PIGMENTS OF THE β-PHASE

[75] Inventors: Manfred Urban, Wiesbaden, Germany; Erwin Dietz, Wilmington, Del.

[73] Assignee: Hoechst Aktiengesellschaft, Germany

[21] Appl. No.: 342,773

[22] Filed: Nov. 21, 1994

[30] Foreign Application Priority Data

Nov. 25, 1993 [DE] Germany .......................... 43 40 125.2

[51] Int. Cl.$^6$ .................................................. C09B 48/00
[52] U.S. Cl. ........................... 106/497; 106/493; 106/494; 106/495; 546/49
[58] Field of Search .............................. 546/49; 106/497, 106/493, 494, 495

[56] References Cited

U.S. PATENT DOCUMENTS

| | | | |
|---|---|---|---|
| 2,844,485 | 7/1958 | Struve | 546/49 |
| 3,257,405 | 6/1966 | Gerson et al. | 106/497 |
| 4,857,646 | 8/1989 | Jaffe | 546/49 |
| 5,229,515 | 7/1993 | Pfenninger | 546/49 |

FOREIGN PATENT DOCUMENTS

| | | |
|---|---|---|
| 0517662 | 5/1992 | European Pat. Off. . |
| 0517663 | 12/1992 | European Pat. Off. . |
| 951451 | 5/1960 | United Kingdom . |

OTHER PUBLICATIONS

European Search Report No. 94118127, dated Jun. 6, 1995.

*Primary Examiner*—Mark L. Bell
*Assistant Examiner*—Scott L. Hertzog
*Attorney, Agent, or Firm*—Connolly & Hutz

[57] ABSTRACT

Linear, unsubstituted quinacridone pigments of the β-phase can be produced in an environmentally friendly manner by a) cyclizing 2,5-dianilinoterephthalic acid in polyphosphoric acid or a polyphosphoric ester to the quinacridone, b) then hydrolyzing the quinacridone with water at a temperature of at least 40° C., preferably at from 60° to 100° C., to obtain a finely divided quinacridone pigment crude which is predominantly in the α-phase, c) then optionally wet grinding the finely divided quinacridone pigment crude from b) (pre-pigment), and d) then heating the crude pigment from b) or the pre-pigment from c) to a temperature between 120° and 200° C. in the presence of from 0.1 to 1.5 times the amount of an inorganic base, based on the weight of the crude pigment, in an inert liquid medium (solvent finish).

To improve the depth and hue of the color, an oxidative treatment with a peroxodisulfate can be carried out subsequently.

17 Claims, 2 Drawing Sheets

PREPARATION OF LINEAR, UNSUBSTITUTED QUINACRIDONE PIGMENTS OF THE β-PHASE

DESCRIPTION

Preparation of linear, unsubstituted quinacridone pigments of the β-phase

The present invention relates to the field of the quinacridone pigments and concerns an environmentally friendly process for preparing linear, unsubstituted quinacridone pigments of the β-phase.

Processes for preparing linear, unsubstituted quinacridone pigments of the β-phase have been known for a long time. For instance, U.S. Pat. No. 2,844,485, discloses grinding the dry coarsely crystalline quinacridone pigment crudes of the α-phase with salt and a liquid hydrocarbon or treating them in a mixture of nitrobenzene and aluminum chloride. Owing to the high salt levels in their waste waters, these processes are ecologically dubious and very costly. Moreover, a mixture of nitrobenzene and aluminum chloride can decompose explosively. The processes of U.S. Pat. No. 2,844,485 take the drying of the crude quinacridone, without which the conversion into the β-phase is not possible, for granted.

U.S. Pat. No. 5,229,515 discloses a process for preparing modified β-quinacridone pigments, in which crude, coarsely crystalline quinacridone pigments of the β-phase are pre-ground dry and subsequently ground wet in the presence of an alcohol and a base. A further treatment with organic peroxides, $H_2O_2$, air or nitrogen-oxygen mixtures can be used to improve the color depth.

GB-A-951,451 describes a process for preparing unsubstituted quinacridone pigments of the β-phase by heating 2,5-dianilinoterephthalic acid in polyphosphoric acid or polyphosphoric esters and subsequent treatment of the resulting moist quinacridone crude in the presence of from eight to twelve times the amount of a from 5 to 20 percent strength by weight alkali metal hydroxide solution, based on the crude quinacridone, bringing about the conversion into the β-phase. The finely divided crude quinacridone pigments of the β-phase are subsequently converted into the pigmentary state by a solvent finish. The large amounts of alkali produced in the course of this process end up in the waste water and make the process uneconomical.

It is an object of the present invention to provide an ecologically and economically favorable process for preparing linear, unsubstituted quinacridone pigments having excellent color properties to overcome the disadvantages of the prior art.

It has now been found that the finely divided predominantly α-phase crude quinacridone pigment synthesized by ring closure of 2,5-dianilinoterephthalic acid in polyphosphoric acid or ester can be converted into the pure β-phase by treating the moist crude quinacridone pigment, preferably after a wet grinding operation, at from 120° to 200° C. in from 0.1 to 1.5 times the amount of an inorganic base in water and alkali-resistant solvents to achieve phase conversion and transformation into the pigmentary state and if desired aftertreating the pigment with a peroxodisulfate.

The present invention accordingly provides a process for preparing linear, unsubstituted quinacridone pigments or pigment preparations of the β-phase, which comprises a) cyclizing 2,5-dianilinoterephthalic acid in polyphosphoric acid or a polyphosphoric ester to the quinacridone, b) then hydrolyzing the quinacridone with water at a temperature of at least 40° C., preferably at from 60° to 100° C., to obtain a finely divided quinacridone pigment crude which is predominantly in the α-phase, c) then optionally wet grinding the finely divided quinacridone pigment crude from b) to form a pre-pigment, and d) then heating the crude pigment from b) or the pre-pigment from c) to a temperature between 120° and 200° C. in the presence of from 0.1 to 1.5 times the amount of an inorganic base, based on the weight of the crude pigment, in an inert liquid medium.

The novel process for preparing the quinacridone pigments of the β-phase mentioned is advantageously applied to the crude pigments obtained in the synthesis described in DE-A-1 150 046 (steps a) and b)), which are in a state of very fine division but are frequently present in agglomerated form. The agglomeration of the crude pigments is dependent on the composition and purity of the starting materials used and on the synthesis conditions. To enhance the color strength, it is of advantage to precede the solvent finish (step d) with a wet grinding operation to reduce the agglomeration of the crude pigments, i.e. to carry out a dispersing operation.

c) Suitable for the wet grinding operation are all dispersing machines and all batchwise and continuous stirred ball mills, roll mills and vibratory mills. A high grinding effect is of advantage. Stirred ball mills are particularly suitable. The grinding media used in these mills include for example balls of zirconium oxide, zirconium mixed oxide, aluminum oxide or quartz having a diameter of less than 2 mm; the grinding media used advantageously have a diameter from 0.2 to 2 mm, preferably from 0.3 to 1 mm. When continuous stirred ball mills are used for the wet grinding operation, the grinding media are preferably separated from the mill base centrifugally, so that the separating apparatus is virtually not touched by the grinding media, making it possible to substantially avoid plugging of the separating apparatus. The stirred ball mills are operated with a high grinding media fill level. In these continuous stirred ball mills, the grinding space is almost completely filled with grinding media.

For the wet grinding operation, the moist press cake of the crude quinacridone pigment is diluted with water to a grindable consistency, and if desired small amounts of solvents, inorganic bases, surfactants or a mixture thereof are added. Preliminary runs are necessary to determine the best grinding conditions. The grinding operation is preferably carried out in an aqueous or aqueous-organic medium in the presence of small amounts of an organic solvent, preferably up to 10% by weight, based on the total mill base, in homogeneous mixture. It is also possible to carry out the grinding operation in an organic medium. Preferably the grinding operation is carried out in the alkaline pH range, preferably at pH 9 to 13.

The concentration of the crude quinacridone pigment in the mill base is dependent on the rheology of the suspension and is advantageously not more than 40% by weight, preferably from 5 to 35% by weight, in particular from 5 to 20% by weight, of the mill base suspension.

Suitable bases for the wet grinding operation include in particular sodium hydroxide, potassium hydroxide, sodium carbonate, potassium carbonate, calcium hydroxide and ammonia. It is also possible to use mixtures of the bases mentioned.

Organic solvents which are advantageously added to the mill base suspension include water-miscible $C_1$–$C_8$-alkanols such as methanol, ethanol, n-propanol, isopropanol, n-butanol, tert-butanol, isobutanol, pentanols, hexanols or alkylhexanols; cyclic alkanols such as cyclohexanol; $C_1$–$C_5$-dialkyl ketones such as acetone, diethyl ketone, methyl isobutyl ketone or methyl ethyl ketone, and also cyclohexanone; ethers and glycol ethers such as tetrahydrofuran, dimethoxyethane, methylglycol, ethylglycol, butylglycol, and ethyldiglycol, methoxypropanol or methoxybutanol; aliphatic amides such as formamide or dimethylformamide; cyclic carboxamides such as N-methylpyrrolidone, valerolactam or caprolactam; heterocyclic bases such as pyridine, morpholine or picoline; and also dimethyl sulfoxide or mixtures of these solvents with water. Particular preference for the grinding operation is given to water and solvents of $C_1$–$C_6$-alkanols in water, in particular to a solution of isobutanol in water. The grinding is carried out at temperatures within the range from 0° to 100° C., advantageously at a temperature between 10° and 60° C., preferably at from 20° to 50° C.

The grinding time is dependent on the fineness requirements of the particular field of application, for example the paint, printing or plastics field. The residence time of the mill base in the stirred ball mill is generally between 5 and 150 minutes, depending on the fineness required. The time is advantageously from 5 to 45 minutes, preferably from 10 to 30 minutes.

During the grinding operation, the phase of the crude quinacridone pigment used is substantially retained. On completion of the grinding operation, the quinacridones are present in finely divided and dispersed form and are known as prepigments.

d) The finely divided prepigments are subjected in aqueous suspension, with or without further addition of a base and preferably after admixture of alkali-resistant organic solvents, to a thermal treatment (solvent finish) to convert them into the β-phase.

It is also possible to subject the finely divided crude pigments to the solvent finish directly, without prior wet grinding, but in some cases the maximum color strength is not achieved.

Suitable solvents for the finishing operation include alkali-resistant solvents, for example $C_1$–$C_8$-alkanols and alicyclic alcohols, such as methanol, ethanol, n-propanol or isopropanol, n-butanol, isobutanol or tert-butanol, pentanols, hexanols, cyclohexanols; glycol ethers, such as monomethyl or monoethyl ethers of ethylene or propylene glycol, butylglycol, ethyldiglycol or methoxy-butanol. Preferred organic solvents are $C_1$–$C_6$-alkanols, in particular ethanol, propanols, butanols and pentanols, particular preference being given to butanols and isopropanol.

Suitable bases for the phase conversion include inorganic bases, for example sodium hydroxide, potassium hydroxide, sodium carbonate, potassium carbonate, calcium hydroxide and ammonia. It is also possible to use mixtures of the bases mentioned.

The conditions which should be observed for carrying out the solvent finish depend to a high degree on the properties desired for the pigments and are in each case optimized thereto. Normally the suspension of the crude pigments or prepigments is treated in the inert liquid medium for phase conversion and transformation to the pigmentary state at a temperature within the range between 120° and 200° C. and under elevated pressure for from 1 to 24 hours. This is advantageously done on the wet-ground suspension without intermediate isolation of the mill base. However, it is also possible to add the aforementioned solvents and inorganic bases, in which case the amount of solvent added can vary within wide limits. Preference is given to using from 0.5 to 10 times, preferably from 1 to 5 times, the weight of solvent of the crude pigments or prepigments, so that an at least 5% strength by weight solution is present in relation to the liquid phase. Based on the crude or prepigment, from 0.1 to 1.5 times, preferably from 0.3 to 1.2 times, the weight of inorganic base has to be present. It is further advantageous for the base to be used in the form of a from 0.1 to 2.0 percent strength by weight, preferably from 0.5 to 1.5 percent strength by weight, aqueous solution. The thermal treatment in the alkaline, aqueous-organic medium is preferably carried out at from 125° to 175° C., advantageously under elevated pressure, for a period of from 1 to 6 hours. After the finishing operation has ended, the solvents used can be recovered and re-used.

The product obtained is pigmentary quinacridone. The size of the pigment particles is below 0.2 μm.

To improve the color properties, the solvent finish can be followed, advantageously after removal of the solvents, by a treatment with a peroxodisulfate at a temperature of at least 50° C., preferably at from 60° to 160° C. The amount of peroxodisulfate used depends on the desired color effect. Based on the weight of the pigment, it is preferable to use from 1 to 10% by weight of peroxodisulfate. The peroxodisulfate can be added in solid form or in the form of an aqueous-alkaline solution. The amount of alkali consumed by the oxidation with the peroxodisulfate can be compensated by addition of alkali before or during the oxidation. Suitable peroxodisulfates include in particular sodium peroxodisulfate, potassium peroxodisulfate and ammonium peroxodisulfate.

Furthermore, surfactants and/or pigment dispersants can be added, to improve the color properties, before, during or after the wet grinding operation, during or after the finishing treatment or during or after the isolation of the pigment. The most suitable time has to be determined beforehand in preliminary experiments. The surfactants and/or pigment dispersants can be added all at once or in a plurality of portions.

Suitable surfactants include for example cationic, anionic and nonionic surfactants, preferably fatty acid taurides, fatty acid sarcosides, fatty alcohol polyglycol ethers, alkylphenol polyglycol ethers, alkanesulfonic acids and also their salts, alkylphenylsulfonic acids and also their salts and alkylphenol polyglycol ether sulfates. Also suitable are rheologically active additives, pigment dispersants based on quinacridone pigments, antifoams and extenders.

Suitable pigment dispersants based on quinacridone pigments include for example compounds of the formula (I)

P—[X]$_m$           (I)

where

P is the m-valent radical of a linear, unsubstituted quinacridone where m is from 1 to 4, and X is a group of the formula (II)

$$-CH_2-\underset{\underset{R^3}{|}}{\overset{\overset{R^1}{|}}{A}}-R^2 \quad\quad (II)$$

where A is a five- or six-membered aromatic, fused or unfused, heterocycle which contains from 1 to 3 identical or different heteroatoms from nitrogen, oxygen or sulfur, preferably imidazolyl or indolyl, and the heterocycle is bonded to the methylene group via a carbon atom, $R^1$ and $R^2$ are each a hydrogen atom or a $C_1$–$C_4$-alkyl, a $C_2$–$C_4$-alkenyl or an aryl group, preferably a phenyl group, or $R^1$ and $R^2$ are together an aliphatic or aromatic ring, $R^3$ is a hydrogen atom, or a $C_1$–$C_4$-alkyl, a $C_1$–$C_3$-hydroxyalkyl or a $C_2$–$C_4$-alkenyl group,
or where
X is a group of the formula (III)

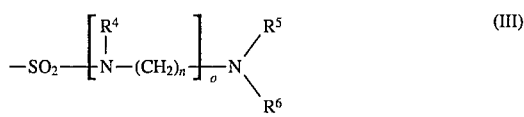

where $R^5$ and $R^6$ are each independently of the other a hydrogen atom or a $C_1$–$C_{20}$-alkyl, a $C_2$–$C_{20}$-alkenyl or a $C_5$–$C_7$-cycloalkyl group, or where $R^5$ and $R^6$ are together with the adjoining nitrogen atom an aliphatic or aromatic, five- or six-membered heterocyclic ring in each case with from 1 to 3 identical or different heteroatoms from nitrogen, oxygen or sulfur in the ring, preferably morpholinyl or pyrrolidinyl, $R^4$ is a hydrogen atom or a $C_1$–$C_4$-alkyl group, n is from 1 to 6 and o is 1 or 2.

Adding the pigment dispersants mentioned gives pigment preparations. The pigment dispersants are added in an amount from 1 to 10% by weight, based on the base pigment.

The choice of organic solvent and the choice of inorganic base, their concentrations, the choice of temperature and the duration of the finishing treatment make it possible to prepare reddish violet quinacridone pigments of the β-phase which possess either a higher transparency or a higher hiding power, depending on the desired use. The amount of oxidizing agent makes it possible to control the depth and hue of the color. The color strength is enhanced at the same time.

The production of quinacridone pigments of the β-phase by the process of the invention is particularly economical and environmentally friendly, since the process of finely dividing the crude pigments by wet grinding does not contaminate the air with dust. In addition, only small amounts of chemicals and solvents are used, which can subsequently be further processed, completely regenerated or disposed of without problems, so that altogether no disposal problems arise.

It is surprising and was unforeseeable that, by the process of the invention, the complete conversion of crude quinacridones into the pigmentary state of the β-phase is possible using less than a tenth of the amount of alkali required in GB-A-951,451. It is also surprising that the color properties can be improved by the aftertreatment with peroxodisulfates, since other oxidizing agents, which are proposed in U.S. Pat. No. 5,229,515 for quinacridone pigments, are not effective when used in the present process.

The pigments and pigment preparations obtainable by the present invention are notable for their excellent color and rheological properties, especially for flocculation resistance, dispersibility, rheology, gloss and color strength.

The pigments and pigment preparations produced according to the invention can be used for pigmenting macromolecular organic materials of natural or synthetic origin.

Macromolecular organic materials which can be pigmented with the pigments and pigment preparations mentioned include for example cellulose ethers and esters, such as ethylcellulose, nitrocellulose, cellulose acetate or cellulose butyrate, natural or synthetic resins, such as addition polymerization resins or condensation resins, e.g. amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or mixed.

The macromolecular organic compounds mentioned can be present as plastic compositions, melts or in the form of spinning solutions, paints, coatings or printing inks. Depending on the intended use, it is advantageous to use the pigments and pigment preparations obtained according to the invention as reductions or in the form of formulations or dispersions. Based on the macromolecular organic material to be pigmented, the pigments and pigment preparations produced according to the invention are used in an amount from 0.1 to 10% by weight.

Particularly preferred coating systems are the novel, waterborne coatings and also the low-solvent high-solids coatings. It is also possible to use the conventional coating systems of the class of the alkyd melamine resin coatings and two-pack coatings, based on alkyd and acrylic resins crosslinkable with polyfunctional isocyanates.

The pigments and pigment preparations produced according to the invention are readily and very finely dispersible in many application media. Such pigment dispersions have a high flocculation resistance and show excellent rheological properties even at high pigmentation. They produce coatings and prints of high color strength, high gloss and high transparency with excellent fastness properties.

To assess the coating properties of the pigments and pigment preparations produced according to the present invention, the multiplicity of known coatings is represented by an aromatics-containing alkyd melamine resin coating (AM) based on a medium-oil, non-drying alkyd resin formed from synthetic fatty acids and phthalic anhydride and a butanol-etherified melamine resin and proportions of a non-drying alkyd resin based on ricinic acid (short-oil), a high solids acrylic baking finish based on a non-aqueous dispersion (HSS), and a waterborne coating based on polyurethane (PUR).

To assess the plastics properties of the pigments and pigment preparations produced according to the present invention, the multiplicity of known plastics is represented by plasticized polyvinyl chloride (PPVC).

To assess the printing properties of the pigments and pigment preparations produced according to the present invention, the multiplicity of known printing systems is represented by an intaglio printing system based on nitrocellulose (NC).

The color strength and hue were determined in accordance with DIN 55986. The rheology of the mill base following dispersion was assessed against the following five-point scale:
5 mobile
4 liquid
3 viscous
2 slightly set
1 set After the mill base had been diluted to the pigment use concentration, the viscosity was measured with a Rossmann "visco spatula", model 301, from Erichsen, Iserlohn.

Gloss measurements were carried out on cast films at an angle of 20° in accordance with DIN 67 530 (ASTMD 523) using a multigloss® meter from Byk-Mallinckrodt, Wesel.

The crystal phase of the crude pigments, prepigments, pigmentary pigments and pigmentary pigment preparations was determined by X-ray spectroscopy. The X-ray spectra were recorded using Cu Kα radiation.

Figure 1:
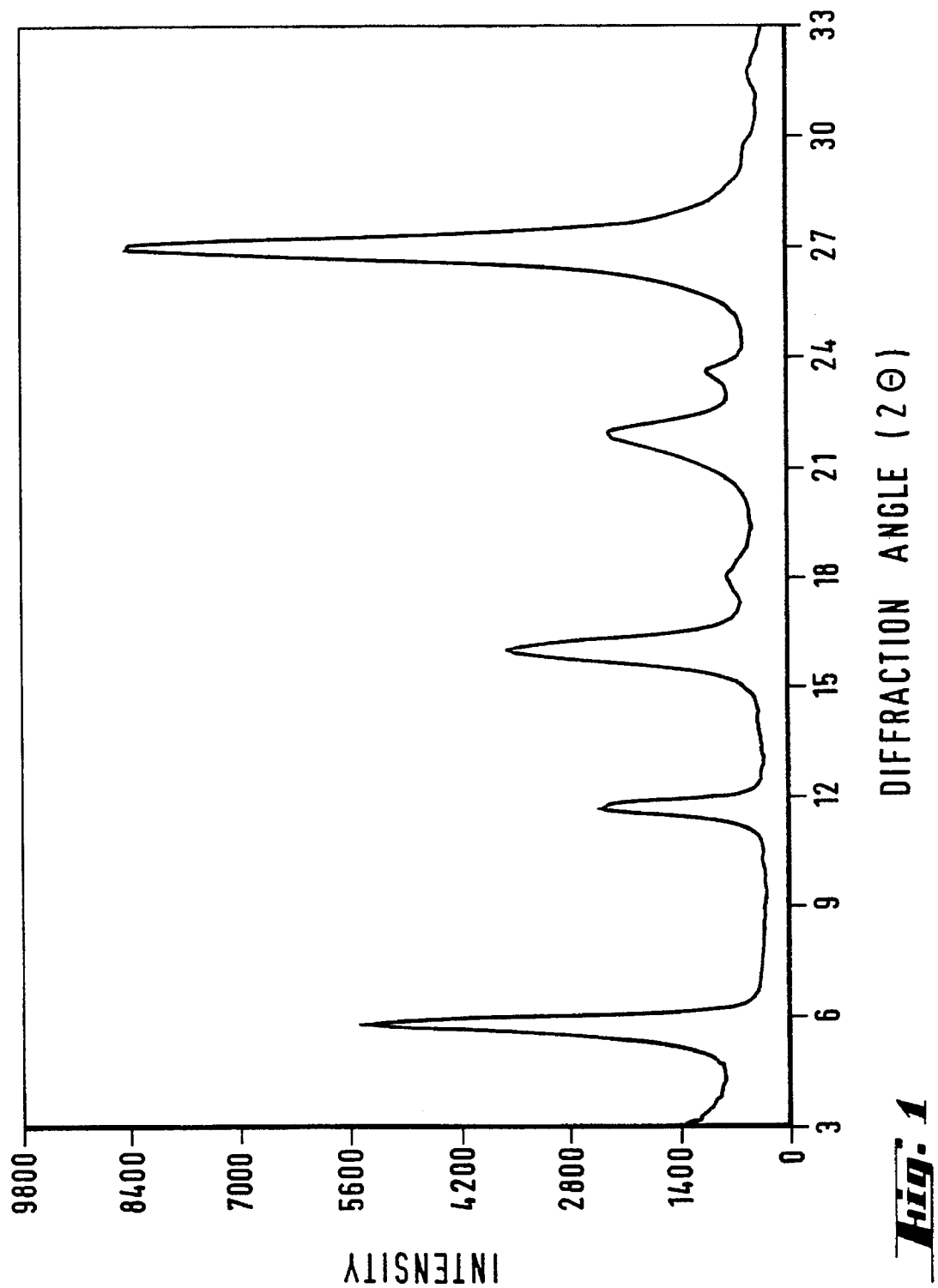
FIG. 1 shows the X-ray diffraction diagram of a linear, unsubstituted quinacridone of the β-phase obtained according to Example 1 of the present invention. The peaks at the diffraction angles 5.65, 11.64, 15.89 and 26.99 [2 theta] show pure, perfectly crystalline β-phase.

Characteristic peaks of the α-phase are completely absent in FIG. 1.

In the Examples which follow, parts and percentages are by weight.

EXAMPLE 1

50.2 parts of 2,5-dianilinoterephthalic acid are introduced with stirring at from 80° to 90° C. into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

Figure 2:
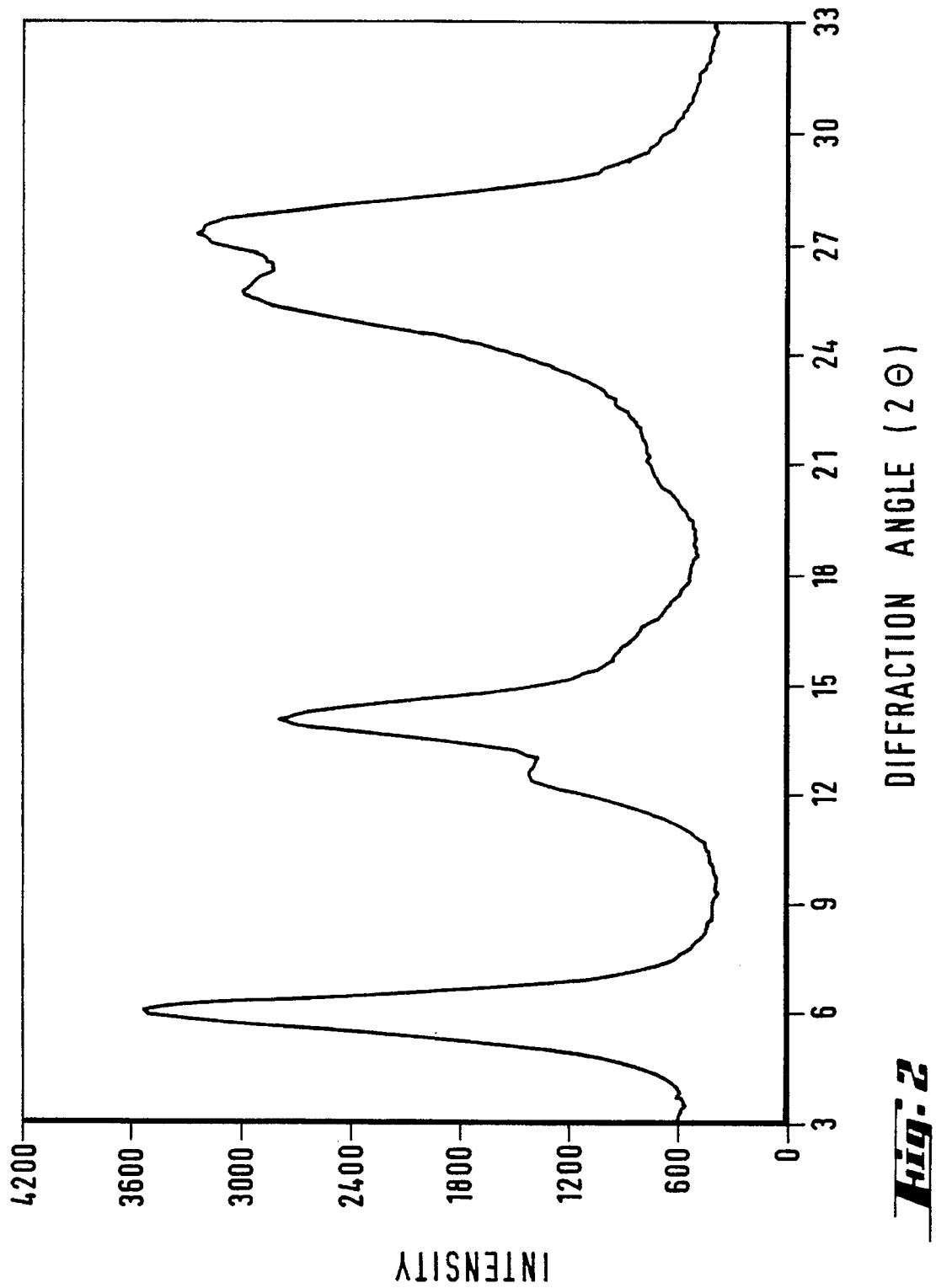
FIG. 2 shows the X-ray diffraction diagram of the corresponding crude quinacridone pigment of the α-phase obtained as described hereinafter in Example 1. The characteristic peaks of the α-phase correspond to the diffraction angles 6.12, 12.36, 13.94, 25.59 and 27.94 [2 theta].

219.8 parts are obtained of a 20.46% strength press cake of crude quinacridone pigment predominantly in the α-phase (FIG. 2).

A stirred ball mill of the type Drais PML (manufacturer: Draiswerke GmbH Mannheim), filled with 1586 parts of zirconium mixed oxide beads from 0.3 to 0.4 mm in diameter as grinding media is used to grind a suspension of 219.8 parts of the crude quinacridone pigment press cake (20.46% strength), 161 parts of water, 20.2 parts of isobutanol (100% pure) and 4 parts of sodium hydroxide (100% pure) at a stirrer circumferential speed of 15.6 m/s and a specific power density of 3.1 kW per liter of grinding space at 25° C. for 10 minutes. After grinding, the mill base suspension is separated from the grinding media.

270 parts of this mill base suspension are introduced into a stirred vessel, 90 parts of isobutanol (100% pure) are added, and the contents are heated at 150° C. under superatmospheric pressure for 5 hours. After cooling down to 90° C., the isobutanol is distilled off azeotropically at up to 100° C. at the bridge. The suspension is cooled down to 60° C., and the pigment is filtered off with suction, washed neutral with water and dried at 80° C.

29.3 parts are obtained of pigment in the β-phase (FIG. 1). Very strong reddish violet coatings are obtained in PUR. The rheology is rated 5. The viscosity is 11.2 s and the gloss measurement is 89. Strong coatings are obtained in AM.

EXAMPLE 2

50.2 parts of 2,5-dianilinoterephthalic acid are introduced with stirring at from 80° to 90° C. into 250 parts of polyphosphoric acid containing 80.3% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

214.3 parts are obtained of a 21.0% strength press cake of crude quinacridone pigment predominantly in the α-phase.

A stirred ball mill of the type Drais PML (manufacturer: Draiswerke GmbH Mannheim), filled with 1586 parts of zirconium mixed oxide beads from 0.3 to 0.4 mm in diameter as grinding media is used to grind a suspension of 214.3 parts of the crude quinacridone pigment press cake (21.0% strength), 166.5 parts of water, 20.2 parts of isobutanol (100% pure) and 4 parts of sodium hydroxide (100% pure) at a stirrer circumferential speed of 15.6 m/s and a specific power density of 3.1 kW per liter of grinding space at 25° C. for 10 minutes. After grinding, the mill base suspension is separated from the grinding media.

270 parts of this mill base suspension are introduced into a stirred vessel, 90 parts of isobutanol (100% pure) are added, and the contents are heated at 150° C. under superatmospheric pressure for 5 hours. After cooling down to 90° C., the isobutanol is distilled off azeotropically at up to 100° C. at the bridge. The suspension is cooled down to 60° C., and the pigment is filtered off with suction, washed neutral with water and dried at 80° C.

29.7 parts are obtained of pigment in the β-phase. Transparent and strong coatings are obtained in AM.

EXAMPLE 3

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

232.7 parts are obtained of a 19.33% strength press cake of crude quinacridone pigment predominantly in the α-phase.

In a stirred vessel, 155.2 parts of the crude quinacridone pigment press cake (19.33% strength), 174.8 parts of water, 90 parts of isobutanol (100% pure) and 3 parts of sodium hydroxide (100% pure) are heated at 150° C. under superatmospheric pressure for 5 hours. After cooling down to 90° C., the isobutanol is distilled off azeotropically at up to 100° C. at the bridge. The suspension is cooled down to 60° C., and the pigment is filtered off with suction, washed neutral with water and dried at 80° C. to leave 29.1 parts of pigment in the β-phase. Transparent and strong coatings are obtained in AM. NC prints are strong and glossy.

EXAMPLE 4

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

212.7 parts are obtained of a 21.15% strength press cake of crude quinacridone pigment predominantly in the α-phase.

In a stirred vessel, 141.8 parts of the crude quinacridone pigment press cake (21.15% strength), 188.2 parts of water, 90 parts of isobutanol (100% pure) and 1.5 parts of sodium hydroxide (100% pure) are heated at 150° C. under superatmospheric pressure for 5 hours. After cooling down to 90° C., the isobutanol is distilled off azeotropically at up to 100° C. at the bridge. The suspension is cooled down to 60° C., and the pigment is filtered off with suction, washed neutral with water and dried at 80° C.

29.4 parts are obtained of pigment in the β-phase. Strong coatings are obtained in AM.

EXAMPLE 5

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

212.7 parts are obtained of a 21.15% strength press cake of crude quinacridone pigment predominantly in the α-phase.

In a stirred vessel, 141.8 parts of the crude quinacridone pigment press cake (21.15% strength), 187.7 parts of water, 90 parts of isobutanol (100% pure) and 3.5 parts of potassium hydroxide (85% strength) are heated at 150° C. under superatmospheric pressure for 5 hours. After cooling down to 90° C., the isobutanol is distilled off azeotropically at up to 100° C. at the bridge. The suspension is cooled down to 60° C., and the pigment is filtered off with suction, washed neutral with water and dried at 80° C.

29.9 parts are obtained of pigment in the β-phase. Strong coatings are obtained in AM.

EXAMPLE 6

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

204.5 parts are obtained of a 22.0% strength press cake of crude quinacridone pigment predominantly in the α-phase.

A stirred ball mill of the type Drais PM1 (manufacturer: Draiswerke GmbH Mannheim), filled with 1000 parts of quartz beads from 1.0 mm in diameter as grinding media is used to grind a suspension of 159 parts of the crude quinacridone pigment press cake (22.0% strength), 172.1 parts of water, 15.8 parts of isobutanol (100% pure) and 3.2 parts of sodium hydroxide (100% pure) at a stirrer speed of 2790 rpm at 25° C. for 2 hours. After grinding, the mill base suspension is separated from the grinding media.

300 parts of this mill base suspension are introduced into a stirred vessel, 90 parts of isobutanol (100% pure) are added, and the contents are heated at 150° C. under superatmospheric pressure for 5 hours. After cooling down to 90° C., the isobutanol is distilled off azeotropically at up to 100° C. at the bridge. The suspension is cooled down to 60° C., and the pigment is filtered off with suction, washed neutral with water and dried at 80° C.

29.7 parts are obtained of pigment in the β-phase. Transparent and strong coatings are obtained in AM.

EXAMPLE 7

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

219.5 parts are obtained of a 20.5% strength press cake of crude quinacridone pigment predominantly in the α-phase.

A stirred ball mill of the type Drais PML (manufacturer: Draiswerke GmbH Mannheim), filled with 1586 parts of zirconium mixed oxide beads from 0.3 to 0.4 mm in diameter as grinding media is used to grind a suspension of 219.5 parts of the crude quinacridone pigment press cake (20.5% strength), 181.5 parts of water and 4 parts of sodium hydroxide (100% pure) at a stirrer circumferential speed of 15.6 m/s and a specific power density of 3.1 kW per liter of grinding space at 25° C. for 30 minutes. After grinding, the mill base suspension is separated from the grinding media.

270 parts of this mill base suspension are introduced into a stirred vessel, 90 parts of isobutanol (100% pure) are added, and the contents are heated at 150° C. under superatmospheric pressure for 5 hours. After cooling down to 90° C., the isobutanol is distilled off azeotropically at up to 100° C. at the bridge. The suspension is cooled down to 60° C., and the pigment is filtered off with suction, washed neutral with water and dried at 80° C.

29.3 parts are obtained of pigment in the β-phase. Transparent and strong coatings are obtained in AM.

EXAMPLE 8

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

212.7 parts are obtained of a 21.15% strength press cake of crude quinacridone pigment predominantly in the α-phase.

In a stirred vessel, 141.8 parts of the crude quinacridone pigment press cake (21.15% strength), 188.2 parts of water, 90 parts of n-butanol (100% pure) and 3 parts of sodium hydroxide (100% pure) are heated at 50° C. under superatmospheric pressure for 5 hours. After cooling down to 90° C., the n-butanol is distilled off azeotropically at up to 100° C. at the bridge. The suspension is cooled down to 60° C., and the pigment is filtered off with suction, washed neutral with water and dried at 80° C.

29.9 parts are obtained of pigment in the β-phase. Transparent and strong coatings are obtained in AM.

EXAMPLE 9

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

212.7 parts are obtained of a 21.15% strength press cake of crude quinacridone pigment predominantly in the α-phase.

A stirred ball mill of the type Drais PML (manufacturer: Draiswerke GmbH Mannheim), filled with 1586 parts of zirconium mixed oxide beads from 0.3 to 0.4 mm in diameter as grinding media is used to grind a suspension of 212.7 parts of the crude quinacridone pigment press cake (21.15% strength), 168.1 parts of water, 20.2 parts of isopropanol (100% pure) and 4 parts of sodium hydroxide (100% pure) at a stirrer circumferential speed of 15.6 m/s and a specific power density of 3.1 kW per liter of grinding space at 25° C. for 10 minutes. After grinding, the mill base suspension is separated from the grinding media.

270 parts of this mill base suspension are introduced into a stirred vessel, 65 parts of isopropanol (100% pure) are added, and the contents are heated at 150° C. under superatmospheric pressure for 5 hours. After cooling down to 90° C., the isopropanol is distilled off azeotropically at up to 100° C. at the bridge. The suspension is cooled down to 60° C., and the pigment is filtered off with suction, washed neutral with water and dried at 80° C.

29.3 parts are obtained of pigment in the β-phase. Strong coatings are obtained in AM. The theology is rated 4–5. The viscosity is 6.1 s and the gloss measurement is 62. In PPVC strong colorings are obtained with satisfactory bleed-out resistance.

EXAMPLE 10

50.2 parts of 2,5-dianilinoterephthalic acid are introduced with stirring at from 80° to 90° C. into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

212.7 parts are obtained of a 21.15% strength press cake of crude quinacridone pigment predominantly in the α-phase.

In a stirred vessel, 189.1 parts of the crude quinacridone pigment press cake (21.15% strength), 250.9 parts of water, 21 parts of isobutanol (100% pure) and 4 parts of sodium hydroxide (100% pure) are heated at 175° C. under superatmospheric pressure for 5 hours. After cooling down to 90° C., the isobutanol is distilled off azeotropically at up to 100° C. at the bridge. The suspension is cooled down to 60° C., and the pigment is filtered off with suction, washed neutral with water and dried at 80° C.

38.8 parts are obtained of pigment predominantly in the β-phase. Transparent and strong coatings are obtained in AM. The viscosity is 5.1 s and the rheology is rated 5.

EXAMPLE 11

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

212.7 parts are obtained of a 21.15% strength press cake of crude quinacridone pigment predominantly in the α-phase.

A stirred ball mill of the type Drais PML (manufacturer: Draiswerke GmbH Mannheim), filled with 1586 parts of zirconium mixed oxide beads from 0.3 to 0.4 mm in diameter as grinding media is used to grind a suspension of 212.7 parts of the crude quinacridone pigment press cake (21.15% strength), 168.1 parts of water, 20.2 parts of isobutanol (100% pure) and 4 parts of sodium hydroxide (100% pure) at a stirrer circumferential speed of 15.6 m/s and a specific power density of 3.1 kW per liter of grinding space at 25° C. for 10 minutes. After grinding, the mill base suspension is separated from the grinding media.

270 parts of this mill base suspension are introduced into a stirred vessel, 90 parts of isobutanol (100% pure) are added, and the contents are heated at 150° C. under superatmospheric pressure for 5 hours. After cooling down to 90° C., 1.5 parts of pigment dispersant of the formula (I) where P is the quinacridone radical, X is the group (III) where $R^4$ is a hydrogen atom and $R^5$ and $R^6$ are each an ethyl group, n is 3 and o is 2 are added. Thereafter the isobutanol is distilled off azeotropically at up to 100° C. at the bridge. The suspension is cooled down to 60° C., and the pigment preparation is filtered off with suction, washed neutral with water and dried at 80° C.

30.8 parts are obtained of pigment preparation in the α-phase. Incorporation into AM gives very transparent and very strong coatings which are particularly resistant to flocculation. The rheology is rated 5. The viscosity is 3.3 s and the gloss measurement is 85.

EXAMPLE 12

50.2 parts of 2,5-dianilinoterephthalic acid are introduced with stirring at from 80° to 90° C. into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

219.8 parts are obtained of a 20.46% strength press cake of crude quinacridone pigment predominantly in the α-phase.

In a stirred vessel, 1195.5 parts of the crude quinacridone pigment press cake (20.46% strength), 244.5 parts of water, 120 parts of isobutanol (100% pure) and 4 parts of sodium hydroxide (100% pure) are heated at 150° C. under superatmospheric pressure for 5 hours. After cooling down to 90° C., 11.5 parts of pigment dispersant of the formula (I) are added in the form of 34.8% strength water-moist press cake where P is the quinacridone radical and X is the group of the formula (II) where A is an imidazolyl radical, $R^1$ is a methyl group, $R^2$ and $R^3$ are each a hydrogen atom and m is 1.8. Thereafter the isobutanol is distilled off azeotropically at up to 100° C. at the bridge. The suspension is cooled down to 60° C., and the pigment preparation is filtered off with suction, washed neutral with water and dried at 80° C.

43.8 parts are obtained of pigment preparation in the β-phase. Incorporated into AM, transparent and strong coatings are obtained. The rheology is rated 5.

EXAMPLE 13

50.2 parts of 2,5-dianilinoterephthalic acid are introduced with stirring at from 80° to 90° C. into 250 parts of methyl polyphosphate containing 82.0% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

212.7 parts are obtained of a 21.15% strength press cake of crude quinacridone pigment predominantly in the α-phase.

A stirred ball mill of the type Drais PML (manufacturer: Draiswerke GmbH Mannheim), filled with 1586 parts of zirconium mixed oxide beads from 0.3 to 0.4 mm in diameter as grinding media is used to grind a suspension of 212.7 parts of the crude quinacridone pigment press cake (21.15% strength), 168.1 parts of water, 20.2 parts of isopropanol (100% pure) and 4 parts of sodium hydroxide (100% pure) at a stirrer circumferential speed of 15.6 m/s and a specific power density of 3.1 kW per liter of grinding space at 25° C. for 10 minutes. After grinding, the mill base suspension is separated from the grinding media.

270 parts of this mill base suspension are introduced into a stirred vessel, 65 parts of isobutanol (100% pure) are added, and the contents are heated at 150° C. under superatmospheric pressure for 5 hours. After cooling down to 90° C., the isopropanol is distilled off azeotropically at up to 100° C. at the bridge. The suspension is cooled down to 60° C., 43.1 parts of ethanol and 9.7 parts of an alkylphenol polyglycol ether sulfate in the form of a 10% strength aqueous solution are added, and adjusted to pH 2 with 10% strength hydrochloric acid. The suspension is stirred at that temperature for 1 hour, and thereafter the pigment is filtered off with suction, washed neutral and salt-free with water and dried at 80° C.

29.3 parts are obtained of a pigment in the β-phase. Incorporated in AM, transparent and strong coatings having very good dispersibility are obtained. The rheology is rated 5.

EXAMPLE 14

50.2 parts of 2,5-dianilinoterephthalic acid are introduced with stirring at from 80° to 90° C. into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

231.9 parts are obtained of a 19.4% strength press cake of crude quinacridone pigment predominantly in the α-phase. In a stirred vessel, 154.6 parts of the crude quinacridone pigment press cake (19.4% strength), 175.4 parts of water, 90 parts of isobutanol (100% pure) and 4 parts of potassium hydroxide (85% strength) are heated at 150° C. under superatmospheric pressure for 5 hours. After cooling down to 90° C., the isobutanol is distilled off azeotropically at up to 100° C. at the bridge. At this temperature a solution of 7.5 parts of water, 0.4 part of potassium hydroxide (85% strength) and 2.14 parts of potassium peroxodisulfate is added, the mixture is subsequently stirred at 100° C. for 1 hour and cooled down to 60° C., and the pigment is filtered off with suction, washed neutral and salt-free with water and dried at 80° C.

28.9 parts are obtained of pigment in the β-phase. Incorporation into AM gives transparent, deep and strong coatings.

EXAMPLE 15

50.2 parts of 2,5-dianilinoterephthalic acid are introduced with stirring at from 80° to 90° C. into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

219.8 parts are obtained of a 20.46% strength press cake of crude quinacridone pigment predominantly in the α-phase.

A stirred ball mill of the type Drais PML (manufacturer: Draiswerke GmbH Mannheim), filled with 1586 parts of zirconium mixed oxide beads from 0.3 to 0.4 mm in diameter as grinding media is used to grind a suspension of 219.8 parts of the crude quinacridone pigment press cake (20.46% strength), 161 parts of water, 20.2 parts of isobutanol (100% pure) and 4 parts of sodium hydroxide (100% pure) at a stirrer circumferential speed of 15.6 m/s and a specific power density of 3.1 kW per liter of grinding space at 25° C. for 10 minutes. After grinding, the mill base suspension is separated from the grinding media.

270 parts of this mill base suspension are introduced into a stirred vessel, 90 parts of isobutanol (100% pure) are added, and the contents are heated at 150° C. under superatmospheric pressure for 5 hours. After cooling down to 90° C., the isobutanol is distilled off azeotropically at up to 100° C. at the bridge. Thereafter a solution of 7.5 parts of water, 0.33 part of sodium hydroxide (100% pure) and 1.88 parts of sodium peroxodisulfate is added at this temperature. The suspension is stirred at 100° C. for 1 hour, and thereafter cooled down to 60° C., and the pigment is filtered off with suction, washed neutral and salt-free with water and dried at 80° C.

29.3 parts are obtained of pigment in the β-phase. Incorporation into AM gives transparent coatings notable for special depth and strength of color. Incorporation into HSS likewise gives deep and strong coatings. The rheology is rated 4 and the gloss measurement is 32.

EXAMPLE 16

50.2 parts of 2,5-dianilinoterephthalic acid are introduced with stirring at from 80° to 90° C., into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

231.9 parts are obtained of a 19.4% strength press cake of crude quinacridone pigment predominantly in the α-phase.

In a stirred vessel, 154.6 parts of the crude quinacridone pigment press cake (19.4% strength), 175.4 parts of water, 90 parts of isobutanol (100% pure) and 3 parts of sodium hydroxide (85% strength) are heated at 150° C. under superatmospheric pressure for 5 hours. After cooling down to 90° C., the isobutanol is distilled off azeotropically at up to 100° C. at the bridge. At this temperature a solution of 7.5 parts of water, 0.15 part of sodium hydroxide (100% strength) and 0.94 part of sodium peroxodisulfate is added. The suspension is stirred at 100° C. for 1 hour and then cooled down to 60° C., and the pigment is filtered off with suction, washed neutral and salt-free with water and dried at 80° C. 28.8 parts are obtained of pigment in the β-phase. Incorporation into AM gives transparent, deep and strong coatings.

EXAMPLE 17

50.2 parts of 2,5-dianilinoterephthalic acid are introduced with stirring at from 80° to 90° C. into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

231.9 parts are obtained of a 19.4% strength press cake of crude quinacridone pigment predominantly in the α-phase.

In a stirred vessel, 154.6 parts of the crude quinacridone pigment press cake (19.4% strength), 175.4 parts of water, 90 parts of isobutanol (100% pure) and 3 parts of sodium hydroxide (85% strength) are heated at 150° C. under superatmospheric pressure for 5 hours. After cooling down to 90° C., the isobutanol is distilled off azeotropically at up to 100° C. at the bridge. At this temperature 1.88 parts of sodium peroxodisulfate are added. The suspension is stirred at 100° C. for 1 hour and then cooled down to 60° C., and the pigment is filtered off with suction, washed neutral and salt-free with water and dried at 80° C.

29.4 parts are obtained of pigment in the β-phase. Incorporation into AM gives transparent, deep and strong coatings.

Comparative Example

If the oxidative aftertreatment is carried out not with sodium peroxodisulfate but with the equivalent amount of sodium perborate, hydrogen peroxide or by the introduction of air as described in EP-A 0 517 663, the subsequent incorporation of the pigments into AM does not result in increases in the depth and strength of the color.

EXAMPLE 18

50.2 parts of 2,5-dianilinoterephthalic acid are introduced with stirring at from 80° to 90° C. into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

231.9 parts are obtained of a 19.4% strength press cake of crude quinacridone pigment predominantly in the α-phase.

In a stirred vessel, 154.6 parts of the crude quinacridone pigment press cake (19.4% strength), 175.4 parts of water, 90 parts of isobutanol (100% pure) and 3 parts of sodium hydroxide (85% strength) are heated at 150° C. under superatmospheric pressure for 5 hours. After cooling down to 90° C., the isobutanol is distilled off azeotropically at up to 100° C. at the bridge. Thereafter the reaction mixture is cooled down to 60° C. and at this temperature a solution of 7.5 parts of water, 0.33 part of sodium hydroxide (100% pure) and 1.88 parts of sodium peroxodisulfate is added. The suspension is stirred at 60° C. for 1 hour and thereafter the pigment is filtered off with suction, washed neutral and salt-free with water and dried at 80° C.

29.0 parts are obtained of pigment in the β-phase. Incorporation into AM gives transparent, deep and strong coatings.

EXAMPLE 19

50.2 parts of 2,5-dianilinoterephthalic acid are introduced with stirring at from 80° to 90° C. into 250 parts of polyphosphoric acid containing 82.7% of $P_2O_5$ and heated at 125° C. for 1 hour to effect the ring closure to the quinacridone. Thereafter the reaction mixture is hydrolyzed with 1125 parts of water at 80° C. with stirring, stirred at 105° C. for 1 hour, and filtered with suction, and the filter residue is washed neutral.

231.9 parts are obtained of a 19.4% strength press cake of crude quinacridone pigment predominantly in the α-phase.

In a stirred vessel, 154.6 parts of the crude quinacridone pigment press cake (19.4% strength), 175.4 parts of water, 90 parts of isobutanol (100% pure) and 3 parts of sodium hydroxide (85% strength) are heated at 150° C. under superatmospheric pressure for 5 hours. After cooling down to 90° C., the isobutanol is distilled off azeotropically at up to 100° C. at the bridge. The temperature is then raised to 150° C. and at this temperature a solution of 7.5 parts of water, 0.33 part of sodium hydroxide (100% pure) and 1.88 parts of sodium peroxo-disulfate is metered in. The suspension is stirred at 150° C. for 1 hour and then cooled down to 60° C., and the pigment is filtered off with suction, washed neutral and salt-free with water and dried at 80° C.

28.5 parts are obtained of pigment in the β-phase. Incorporation into AM gives transparent, deep and strong coatings.

What is claimed is:

1. A process for preparing linear, unsubstituted quinacridone pigments or pigment preparations of the β-phase, which comprises
   a) cyclizing 2,5-dianilinoterephthalic acid in polyphosphoric acid or in polyphosphoric ester to the quinacridone,
   b) then hydrolyzing the quinacridone with water at a temperature of at least 40° C. to obtain a finely divided quinacridone crude pigment which is predominantly in the α-phase,
   c) then optionally wet grinding the finely divided quinacridone crude pigment from b) to form a prepigment, and
   d) then heating the crude pigment from b) or the prepigment from c) to a temperature between 120° and 200° C. in the presence of from 0.1 to 1.5 times the amount of an inorganic base, based on the weight of the crude pigment, in an inert liquid medium.

2. The process of claim 1, wherein the wet grinding in the presence of an inorganic base is carried out in an aqueous or aqueous-organic medium.

3. The process of claim 1, wherein step d) is carried out in the presence of from 0.3 to 1.2 times the amount of an inorganic base, based on the weight of the crude pigment.

4. The process of claim 1,
   wherein the inorganic base is used in the form of a from 0.1 to 2.0% strength by weight aqueous solution.

5. The process of claim 1, wherein the inorganic base is used in the form of a from 0.5 to 1.5% strength by weight aqueous solution.

6. The process of claim 1, wherein the inorganic base is sodium hydroxide, potassium hydroxide, sodium carbonate, potassium carbonate, ammonia or a mixture thereof.

7. The process of claim 1, wherein step d) is carried out in the presence of from 0.5 to 10 times the weight of an alkali-resistant solvent based on the weight of the crude pigment.

8. The process of claim 1, wherein step d) is carried out in the presence of from 1 to 5 times the weight of an alkali-resistant solvent based on the weight of the crude pigment.

9. The process of claim 7, wherein the alkali-resistant solvent is a $C_1$–$C_6$-alkanol.

10. The process of claim 7, wherein the alkali-resistant solvent is a butanol or isopropanol.

11. The process of claim 1, wherein step d) is carried out at a temperature between 125° and 175° C.

12. The process of claim 1, further comprising the addition, before, during or after step d), of a pigment dispersant of the formula (I)

where

P is the m-valent radical of a linear, unsubstituted quinacridone where m is from 1 to 4, and X is a group of the formula (II)

where A is a five- or six-membered aromatic, fused or unfused, heterocycle which contains from 1 to 3 identical or different heteroatoms selected from the group consisting of nitrogen, oxygen or sulfur and the heterocycle is bonded to the methylene group via a carbon atom, $R^1$ and $R^2$ are each a hydrogen atom or a $C_1$–$C_4$-alkyl, a $C_2$–$C_4$-alkenyl or an aryl group, or $R^1$ and $R^2$ are together an aliphatic or aromatic ring, $R^3$ is a hydrogen atom, or a $C_1$–$C_4$-alkyl, a $C_1$–$C_3$-hydroxyalkyl or a $C_2$–$C_4$-alkenyl group, or where X is a group of the formula (III)

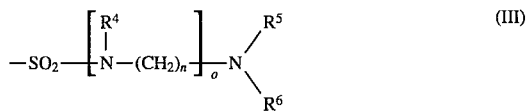

where $R^5$ and $R^6$ are each independently of the other a hydrogen atom or a $C_1$–$C_{20}$-alkyl, $C_2$–$C_{20}$-alkenyl or a $C_5$–$C_7$-cycloalkyl group, or where $R^5$ and $R^6$ are together with the adjoining nitrogen atom an aliphatic or aromatic, five- or six-membered heterocyclic ring in each case with from 1 to 3 identical or different heteroatoms selected from the group consisting of nitrogen, oxygen or sulfur in the ring, $R^4$ is a hydrogen atom or a $C_1$–$C_4$-alkyl group, n is from 1 to 6 and o is 1 or 2.

13. The process of claim 12, wherein A is imidazolyl or indolyl.

14. The process of claim 12, wherein $R^5$ and $R^6$ are together with the adjoining nitrogen atom a morpholinyl or pyrrolidinyl ring.

15. The process of claim 1, further comprising, after step d), heating the quinacridone pigment or pigment preparation to a temperature between 60° and 160° C. in the presence of a peroxodisulfate.

16. The process of claim 15, wherein the peroxodisulfate used comprises from 1 to 10% by weight, based on the weight of the quinacridone pigment, of sodium, potassium or ammonium peroxodisulfate.

17. A method of pigmenting paints, plastics and printing inks comprising the step of incorporating a quinacridone pigment or pigment preparation of claim 1 into said paints, plastics and printing inks.

* * * * *